April 5, 1949.  C. A. EVANS  2,466,586
METHOD AND APPARATUS FOR MOLDING DOLL HEADS
Filed March 15, 1946  2 Sheets-Sheet 1
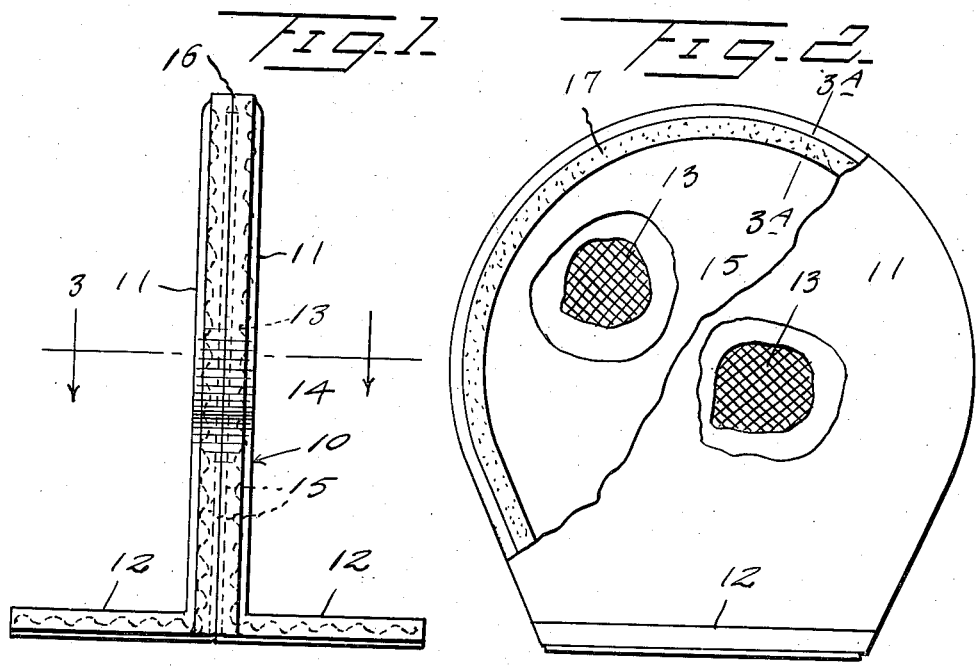
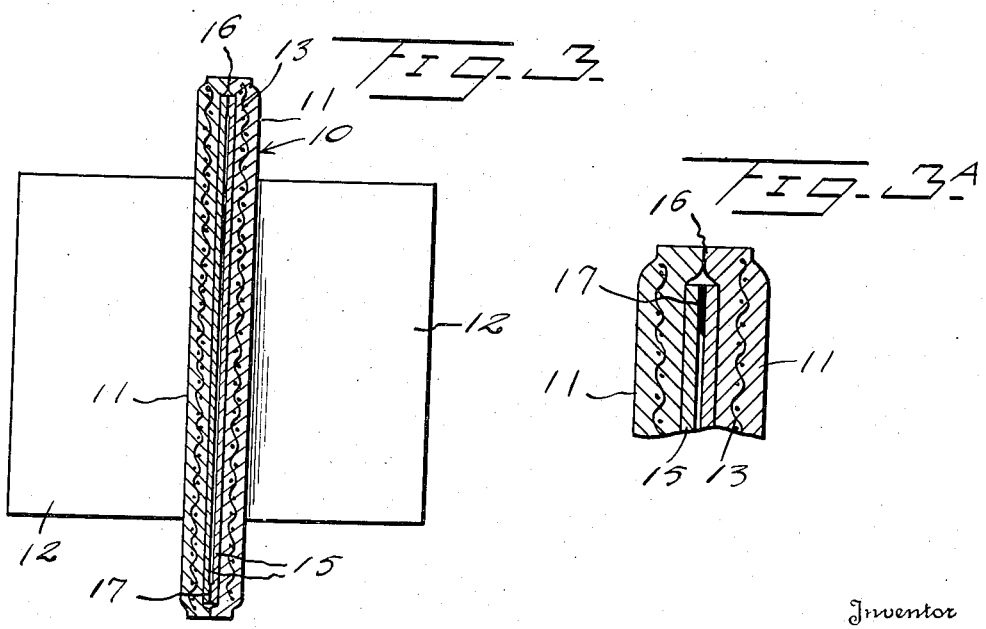
Inventor
C. A. Evans
By Kimmel & Crowell
Attorneys

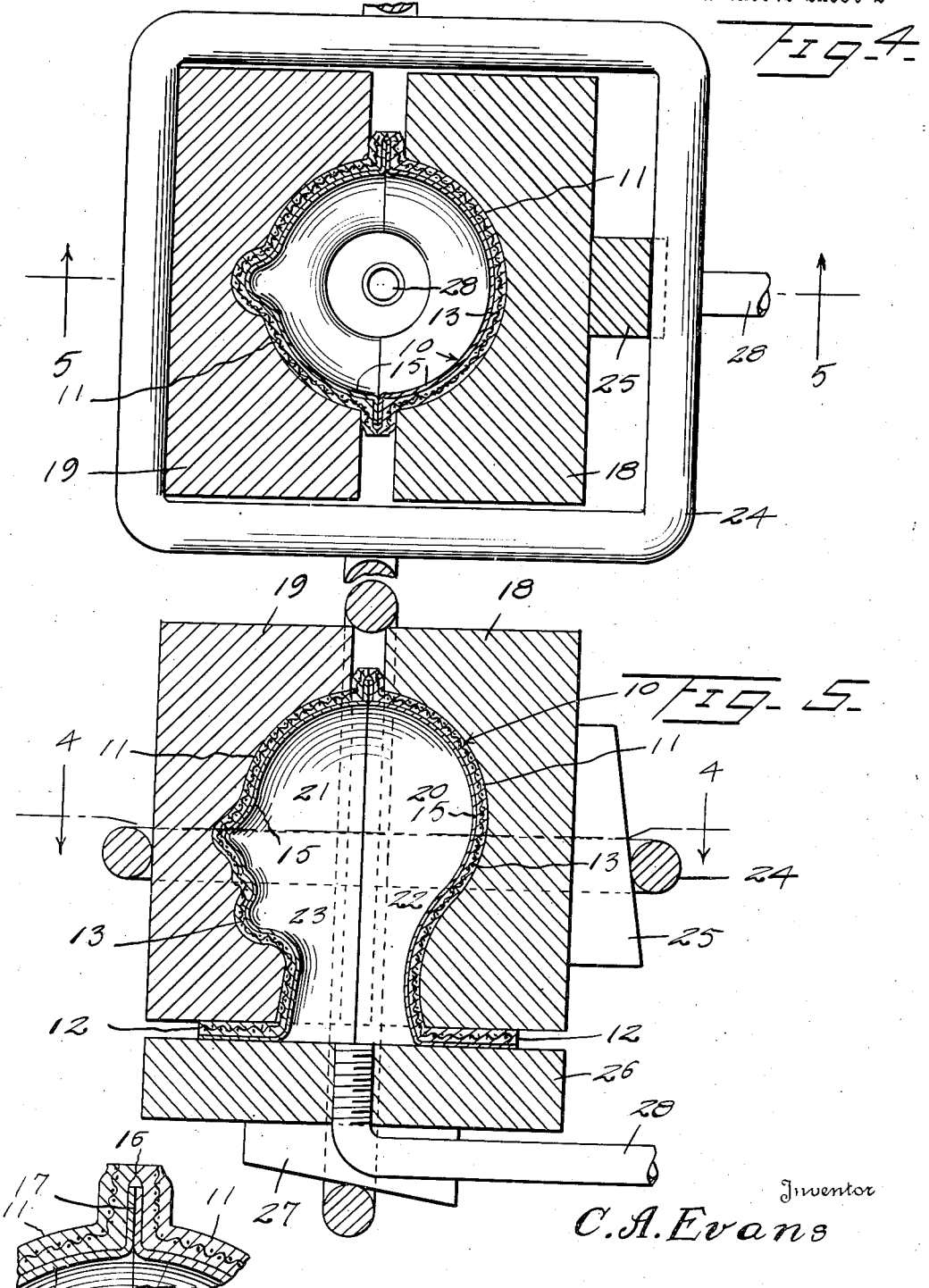

Patented Apr. 5, 1949

2,466,586

UNITED STATES PATENT OFFICE 2,466,586

METHOD AND APPARATUS FOR MOLDING DOLL HEADS

Clarence Agustus Evans, Atlanta, Ga.

Application March 15, 1946, Serial No. 654,703

1 Claim. (Cl. 154—110)

This invention relates to a method and means for making doll heads from thermo-plastic resinous material.

An object of this invention is to provide an improved method of making doll heads which eliminates the use of an inner form, and provides a rapid method of making such heads.

Another object of this invention is to provide an improved method and means for making doll heads which includes initially forming the head as a blank envelope, inserting the envelope in a form or mold, and then subjecting the envelope to an interior fluid pressure in the form of air or the like, the form or mold being initially heated to a degree such that the inflated envelope will be deformed to the configuration of the interior of the mold.

A further object of this invention is to provide an improved method and means for making doll heads which includes inserting into a heated mold an envelope which is impregnated with suitable plastic material in an unpolymerized state, the envelope being preferably formed of fabric, such as gauze, paper or the like which is impregnated with resin of the thermo-setting or thermo-plastic type and which will readily deform and set under interior pressure and heat.

With the foregoing objects in view, and others which may hereinafter more fully appear, the invention consists of the novel construction, combination and arrangement of parts, as will be more specifically described, and illustrated in the accompanying drawings, wherein are shown embodiments of the invention, but it is to be understood that changes, variations and modifications may be resorted to which fall within the scope of the invention, as claimed.

In the drawings:

Figure 1 is a detail edge view of an envelope constructed according to an embodiment of this invention.

Figure 2 is a detail side elevation, partly broken away of the envelope.

Figure 3 is a sectional view taken on the line 3—3 of Fig. 1.

Figure 3A is a fragmentary sectional view similar to Fig. 3 on an enlarged scale.

Figure 4 is a sectional view taken on the line 4—4 of Fig. 5.

Figure 5 is a sectional view taken on the line 5—5 of Fig. 4.

Figure 6 is a fragmentary sectional view through the molded doll head.

Referring to the drawings, the numeral 10 designates generally an envelope in blank form, which is formed of opposed flat members embodying a substantially ovoidal body 11 which is formed with a base flange 12 of substantial width. The body 11 and the flange 12 are formed of an inner member 13 which is here shown as being a fabric impregnated with and embedded with a plastic body 14. The inner member 13 may be either a loose woven fabric, such as gauze or the like, or it may be formed of paper which is impregnated with and embedded within the plastic body 14.

The body 14 may be an unpolymerized resin of either the thermo-setting type or may be a thermo-plastic resin, and the body 14 may be formed of urea formaldehyde or phenol formaldehyde. In the event the envelope is made quite thin or of relatively weak material a reinforcing ply may be adhesively secured to the inner surface of the body 11 and the flange 12. This reinforcing ply designated 15 may be formed of cellophane, coated paper, metalfoil or the like. Where the reinforcing ply 15 is used, this ply may be slightly smaller in size than the body 11 and the flange 12, so that the two sides of the envelope may be firmly secured together and seal about the marginal edges thereof, as shown at 16. This sealing is done by means of heat, an adhesive or the like. The reinforcing ply 15 of one part of the envelope may be secured to the confronting ply by means of an adhesive 17 or other securing means. The purpose of sealing the edges of the envelope parts is to provide an air-tight envelope which will readily inflate when placed under air pressure within the mold. Where the two portions forming the envelope will form an air-tight seal the procedure of sealing the edges thereof may be eliminated as the contacting portions of the envelope parts will amalgamate with each other during the molding under heat.

The lower end of the envelope between the ends of the flanges 12 is open, the purpose for which will be hereinafter described. The envelope 10 is disposed between a pair of mold members 18 and 19 which are formed with cavities 20 and 21, respectively. The cavities 20 and 21 are shaped to the configuration of a head, and include neck forming cavities 22 and 23, respectively. A ring or loop 24 is disposed about the mold members 18 and 19, and the mold members are held in clamped position with the marginal portions of the body members 11 disposed therebetween by means of a wedge.

The flanges 12 engage against the bottom of the mold members 18 and 19, and the flanges 12 are tightly clamped against the bottom of the mold members by means of a bottom clamping plate 26. A ring 27 engages loosely about the plate 26 and the mold sections 18 and 19, being disposed outside of the ring 24, and is held in clamping position by means of a wedge 27. The plate 26 has an air supply pipe 28 connected thereto which is disposed centrally of the plate, and is adapted to provide for the discharge of air into the interior of the mold. When the envelope is initially disposed between the mold sections 18 and 19 the center of the envelope at the open end thereof will extend over the discharge end of the air supply, so that the air pressure will cause the envelope to inflate. A portion of the inner part of the flanges 12 will move upwardly into the neck cavities 22 and 23, and will provide the extra material necessary to have the envelope conform to the configuration of the inside of the mold.

In the carrying out of the method hereinbefore described, and in the use of the apparatus, the envelope which may be formed as herein set forth is inserted between the heated mold sections 18 and 19. These sections are heated to from 275° F. to 325° F. in order that the heat of the mold will effect a melting of the plastic composition. After the envelope has been placed under the desired or necessary pressure to effect inflation thereof, the mold may be permitted to cool. If there is any undue adherence of the molded envelope which is now in the form of a doll head, wax or other suitable coating may be used to coat the inner surface of the mold. If desired the mold may be used in the curing process, or the molded head may be removed and cured in an oven or the like. The surplus material is removed by cutting, grinding, buffing or other suitable means, after which the head is painted, tinted or otherwise treated.

What is claimed is:

The method of making doll heads which includes impregnating a pair of blank fibrous sheets with unpolymerized resin, sealing the marginal edges of the sheets for the major portion of the length thereof, bending the unsealed portions of the sheets in opposite directions, clamping the secured together sheets in a mold which is heated to a degree to effect pliability of the sheets with the mold clamping the sealed edges and the oppositely bent portions, and inflating the envelope through the unsecured portions thereof.

CLARENCE AGUSTUS EVANS.

REFERENCES CITED

The following references are of record in the file of this patent:

UNITED STATES PATENTS

| Number | Name | Date |
| --- | --- | --- |
| 762,063 | Kepler | June 7, 1904 |
| 1,052,081 | Miltner | Feb. 4, 1913 |
| 1,310,437 | Roberts | July 22, 1919 |
| 1,310,439 | Roberts | July 22, 1919 |
| 1,404,320 | Roberts et al. | Jan. 24, 1922 |
| 1,442,900 | O'Connor | Jan. 23, 1923 |
| 1,872,912 | Dreyfus | Aug. 23, 1932 |
| 1,888,702 | Snyder | Nov. 22, 1932 |
| 1,920,961 | Anderson | Aug. 8, 1933 |